Patented Apr. 5, 1932

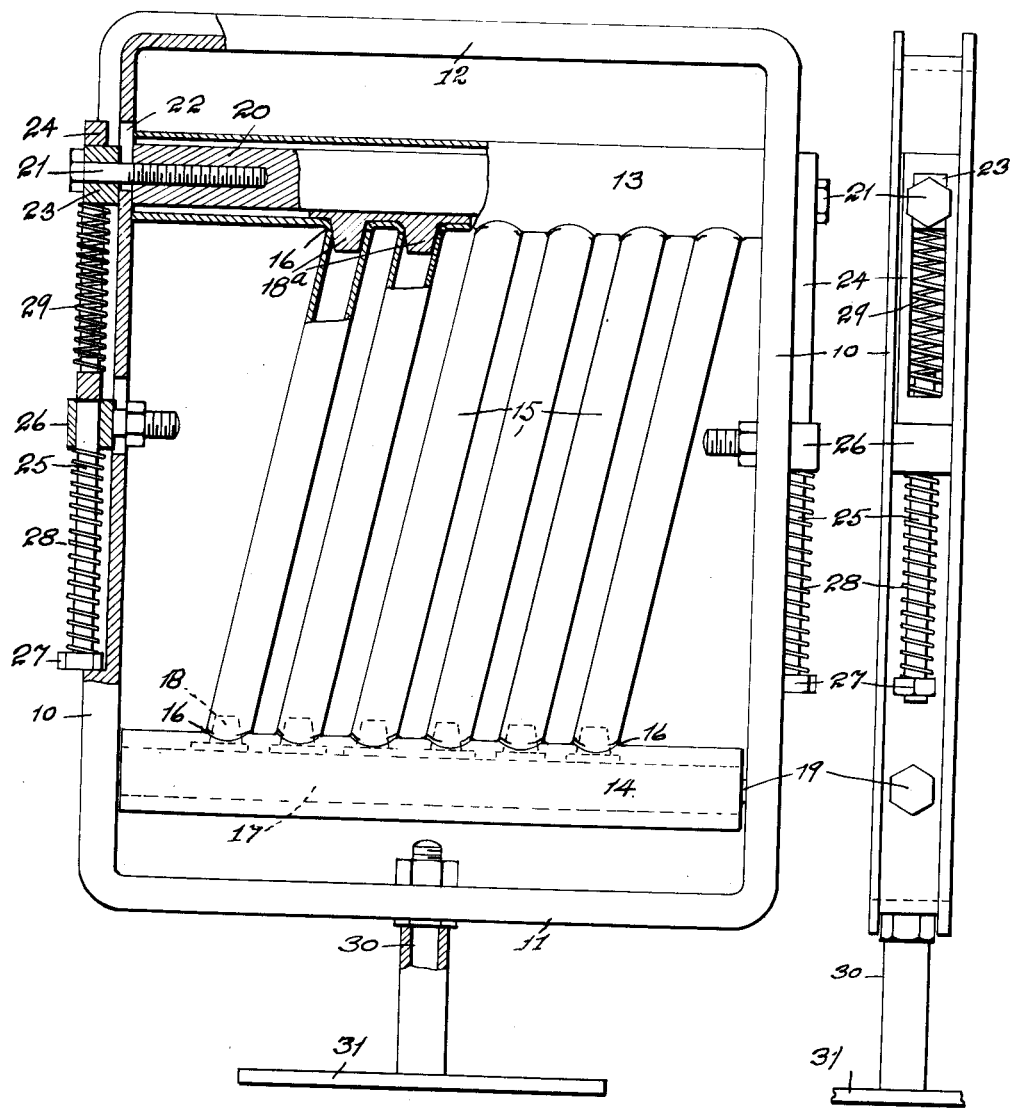

1,852,180

UNITED STATES PATENT OFFICE

RUFUS R. McKNIGHT AND ARTHUR WEBBER, OF CHICAGO, ILLINOIS, ASSIGNORS TO THE DEMOE ENGINEERING LABORATORIES, INC., OF CHICAGO, ILLINOIS, A CORPORATION OF ILLINOIS

APPARATUS FOR WELDING TUBE CONNECTIONS

Original application filed February 1, 1930, Serial No. 425,104. Divided and this application filed January 31, 1931. Serial No. 512,539.

This invention relates to apparatus for welding tube connections, the same being a division of application Serial No. 425,104, filed February 1, 1930.

The apparatus of the present invention is designed for the purpose of facilitating the welding of the ends of a group of tubes to the headers with which the tubes are associated; and the object of the invention is to provide means for supporting and maintaining the tubes in spaced relation to one another and with their ends in associated relation with the headers while the welding operation is being performed.

The invention has particular relation to the welding of a group of tubes standing in parallel relation to one another and having their ends butt-welded to the margins of throated apertures which are formed in aligned relation to one another along the walls of the respective headers.

In order to maintain the tubes and headers properly assembled during the welding operation, it is necessary to properly support the tubes and headers by the employment of mandrels, which are inserted from within the headers and through the throated apertures and in position to hold the abutted ends of the tubes against displacement until the welding is completed. Separate mandrels are preferably provided at each end of each of the tubes, and it is necessary to support the mandrels from within the tubes during the welding operations in order to maintain them in inserted relation to the tubes, and it is also necessary to make provision for the expansion and contraction of the metal under the heat incident to the welding operation, and the present invention is particularly designed with reference to these requirements.

Further objects and details will appear from a description of the invention in conjunction with the accompanying drawings, wherein,—

Figure 1 is a side elevation of the frame constituting the present invention, partially sectioned away to illustrate the interior arrangement; and Fig. 2 is an edge elevation thereof.

The frame of the present invention is of open rectangular form and preferably constructed of a continuous section of channeled metal, which affords vertical side rails 10 and a lower cross rail 11 and an upper cross rail 12.

The side rails are spaced sufficiently to afford space for the mounting of a lower header 13 and an upper header 14, which are vertically spaced apart to the degree required for the interposition of the tubes 15, which as shown stand in parallel relation to one another and in oblique relation to the upper and lower headers.

Each of the headers is provided with a row of throated apertures 16, affording outstanding margins against which the ends of the respective tubes abut and to which the ends of the tubes must be welded.

The lower header is supported upon a rod 17, which extends lengthwise through the interior of the header and traverses the space between the side rails of the frame to which the ends of the rod are secured. The rod is of somewhat less diameter than the interior diameter of the lower header and serves as a support for a plurality of conical mandrels 18, one of which is entered through each of the apertures in the lower header and into the end of the associated tube. The mandrels serve to position the lower ends of the tubes in abutting relation upon the throated apertures and until they are permanently connected by the welding operation.

Screw means, as for instance a bolt 19, are provided for holding the rod 17 in position within the frame, and at the same time permit the rod to be disconnected and removed from the frame in order to enter the rod through the interior of the header. Sufficient clearance in diameter between the rod and the interior of the header is afforded to permit the group of mandrels to be positioned before the rod is inserted, which rod serves to hold the mandrels against falling or displacement.

A similar rod 20 is entered through the upper header 14 and serves to hold in place a group of mandrels 18ª which are entered through the apertures in the upper header and into the upper ends of the tubes. The upper rod 20 is slidably mounted within the frame by the provision of bolts 21 which pass through vertically elongated slots 22 in the frame, the bolts being carried by slide blocks 23 slidably mounted within slotted slide bars 24, one at each end of the frame.

Each of the slide bars is provided with a depending stem 25 slidably mounted within a lug 26 secured to the proximate channeled side rail of the frame.

Each of the stems is provided at its lower end with a head 27, and between the head and the lug the stem is encircled by a coil spring 28 which serves to resist an upward thrust of the slotted slide bar, but allows the same to yield under pressure.

Each of the blocks 23 is acted upon by a coil spring 29 which is inserted within the slot in the associated slide bar and serves to resist a downward movement of the slide block.

The arrangement is one which serves to maintain the upper rod 20 in normally spaced relation to the lower rod 17, but at the same times permits the upper rod to yield in either direction under pressure to permit variations in the spaced relation of the two bars incidental to the expansion and contraction of the tubes under heat during the welding operation. It will be understood that the arrangement above described is the same on each side of the frame.

In order to facilitate manipulation, the frame as a whole is swivelly mounted upon a post 30 carried by a base plate 31.

In use, the upper and lower rods are removed from the frame, and the separate mandrels are inserted from within through the throated apertures in the upper and lower headers respectively. Thereafter, the headers are mounted upon the rods, which serve to prevent displacement of the mandrels.

The tubes may then be positioned with their respective ends fitted upon the mandrels and in abutting relation with the margins of the throated apertures. With the parts thus assembled, the upper and lower rods may be fitted into position and secured within the frame, after which the welding operation will proceed.

Optionally, if desired, the rods with the headers mounted thereon and with the mandrels projecting from the apertures may be first mounted within the frame and the tubes inserted by springing up the upper rod with the header and mandrels carried thereby sufficiently to permit insertion of the tubes in position, the spring arrangement affording sufficient yield to permit the tubes to be inserted in this manner.

During the welding operation, the tubes will tend to expand under heat, and such expansion is provided for by a bodily movement of the slide bars against the tension of the springs 25, so that, irrespective of such expansion, the tubes will maintain their abutting relation upon the margins of the throated apertures.

During the cooling and contraction after the heating operation, a reverse movement against spring tension will occur and if additional contraction is occasioned, the same will be provided for by the yielding of the springs 23 which bear upon the slide blocks. In this way a firm union is maintained at all times during the welding operation, and any danger of disruption of the welded joints, either during the welding operation or afterwards, is prevented.

The use of the frame affords a convenient and satisfactory method of holding the tubes and headers in position and in properly spaced relation with one another, and permits the welding to proceed rapidly and uniformly, and to complete the welding of an entire group of tubes without interruption in the welding due to the necessity for positioning the tubes individually.

Although the invention has been described with particularity as to detail, it is not the intention, unless otherwise indicated in the claims, to limit the same to the exact description, since variations thereof may be made without departing from the spirit of the invention.

We claim:

1. In an apparatus for holding tubes and apertured headers in registered position during welding, the combination of a frame, spaced supporting members carried by the frame and adapted respectively to be inserted through headers having apertures in their side walls, and mandrels supported by said spaced supporting members and projected through the apertures in the headers and adapted to have their ends respectively entered into the open ends of the tubes to be welded to hold the same in register with said apertures during the welding operation.

2. In an apparatus for holding tubes and apertured headers in registered position during welding, the combination of a frame, spaced supporting members carried by the frame and adapted respectively to be inserted through headers having apertures in their side walls, and mandrels supported by said spaced supporting members and projected through the apertures in the headers and adapted to have their ends respectively entered into the open ends of the tubes to be welded to hold the same in register with said apertures during the welding operation, one of said spaced supporting members being yieldable with respect to the other to compensate for variations in the tube length occasioned by the heat of the welding operation.

3. In an apparatus for holding tubes and apertured headers in registered position during welding, the combination of a frame, spaced supporting members carried by the frame and adapted respectively to be inserted through headers having apertures in their side walls, and mandrels supported by said spaced supporting members and projected through the apertures in the headers and adapted to have their ends respectively entered into the open ends of the tubes to be welded to hold the same in register with said apertures during the welding operation, one of said spaced supporting members being yieldable in both directions with respect to the other to compensate for variations in the tube length occasioned by the heat of the welding operation.

4. In an apparatus for holding tubes and apertured headers in registered position during welding, the combination of an open frame, a pair of spaced supporting members removably secured within the opening in said frame and in spaced relation to one another and adapted to be respectively inserted through the apertured headers, and mandrels bearing respectively against the upper and lower supporting members and having their ends entered through the apertures in the respective headers and into the registering open ends of tubes extending between the headers.

5. In an apparatus for holding tubes and apertured headers in registered position during welding, the combination of an open frame, a pair of spaced supporting members removably secured within the opening in said frame and in spaced relation to one another, one of said supporting members being yieldably mounted at each end to permit variation in the spacing of said supporting members during the welding operation, and adapted to be respectively inserted through the apertured headers, and mandrels bearing respectively against the upper and lower supporting members and having their ends entered through the apertures in the respective headers and into the registering open ends of tubes extending between the headers.

6. In an apparatus for holding tubes and apertured headers in registered position during welding, the combination of an open frame, a pair of spaced supporting members removably secured within the opening in said frame and in spaced relation to one another and adapted to be respectively inserted through the apertured headers, and individually positioned groups of mandrels bearing respectively against the upper and lower supporting members and having their ends entered through the apertures in the respective headers and into the registering open ends of tubes extending between the headers.

7. In an apparatus for holding tubes and apertured headers in registered position during welding, the combination of an open frame, a pair of spaced supporting members removably secured within the opening in said frame and in spaced relation to one another, one of said supporting members being yieldably mounted at each end to permit variation in the spacing of said supporting members during the welding operation, the supporting members being adapted to be respectively inserted through the apertured headers, and groups of individually positioned mandrels bearing respectively against the upper and lower supporting members and having their ends entered through the apertures in the respective headers and into the registering open ends of tubes extending between the headers.

8. In an apparatus for holding tubes and apertured headers in registered position during welding, the combination of an open frame, a pair of spaced supporting members removably secured within the opening in said frame and in spaced relation to one another, one of said supporting members being yieldably mounted at each end to permit variation in the spacing of said supporting members during the welding operation, the supporting members being adapted to be respectively inserted through the apertured headers, and mandrels bearing respectively against the upper and lower supporting members and having their ends entered through the apertures in the respective headers and into the registering open ends of tubes extending between the headers, and a swivel mounting for the frame, adapting the same to be conveniently turned thereon.

9. In an apparatus for holding tubes and apertured headers in registered position during welding, the combination of an open frame, a pair of spaced supporting members removably secured within the opening in said frame and in spaced relation to one another and adapted to be respectively inserted through the apertured headers, and groups of individually positioned mandrels bearing respectively against the upper and lower supporting members and having their ends entered through the apertures in the respective headers and into the registering open ends of tubes extending between the headers, and a swivel mounting for the frame, adapting the same to be conveniently turned thereon.

10. In an apparatus for holding tubes and apertured headers in registered position during welding, the combination of an open frame, a pair of spaced supporting members removably secured within the opening in said frame and in spaced relation to one another, one of said supporting members being yieldably mounted at each end to permit variation in the spacing of said supporting members during the welding operation, the supporting members being adapted to be respectively inserted through the apertured headers, and groups of individually positioned mandrels bearing respectively against the upper and lower supporting members and having their ends entered through the apertures in the respective headers and into the registering open ends of tubes extending between the headers, and a swivel mounting for the frame, adapting the same to be conveniently turned thereon.

RUFUS R. McKNIGHT.
ARTHUR WEBBER.